United States Patent
Dhawan et al.

(10) Patent No.: US 9,983,759 B1
(45) Date of Patent: May 29, 2018

(54) METHOD AND SYSTEM FOR SHARING VIRTUAL COLLABORATION OBJECTS

(75) Inventors: Rohit Dhawan, Edison, NJ (US); Apoorva Yogeshpal Rais, Hicksville, NY (US)

(73) Assignee: Google LLC, Mountain View, CA (US)

( * ) Notice: Subject to any disclaimer, the term of this patent is extended or adjusted under 35 U.S.C. 154(b) by 446 days.

(21) Appl. No.: 13/409,015

(22) Filed: Feb. 29, 2012

(51) Int. Cl.
  *G06F 3/048* (2013.01)

(52) U.S. Cl.
  CPC .................................. *G06F 3/048* (2013.01)

(58) Field of Classification Search
  CPC .............................. G06F 3/0484; G06F 3/0481
  USPC ......................................................... 715/751
  See application file for complete search history.

(56) References Cited

U.S. PATENT DOCUMENTS

| | | | |
|---|---|---|---|
| 6,397,231 B1 | 5/2002 | Salisbury et al. | |
| 6,681,396 B1* | 1/2004 | Bates | H04N 5/782 |
| | | | 386/E5.043 |
| 7,003,550 B1* | 2/2006 | Cleasby | G06F 17/30873 |
| | | | 707/E17.111 |
| 8,417,666 B2* | 4/2013 | Bailor | G06F 17/24 |
| | | | 707/608 |
| 8,660,986 B2* | 2/2014 | Iordanov | G06Q 10/101 |
| | | | 707/608 |
| 9,021,386 B1* | 4/2015 | Rasmussen | G06F 3/002 |
| | | | 715/785 |
| 2002/0165922 A1* | 11/2002 | Wei | G09B 5/06 |
| | | | 709/205 |
| 2005/0138566 A1* | 6/2005 | Muller | G06Q 10/00 |
| | | | 715/759 |
| 2006/0015925 A1* | 1/2006 | Logan | G06Q 30/02 |
| | | | 725/135 |
| 2006/0271603 A1* | 11/2006 | Mathias | G06F 17/30179 |
| 2008/0065675 A1* | 3/2008 | Bozich | G06F 17/30011 |
| 2008/0092054 A1* | 4/2008 | Bhumkar | G06F 3/0482 |
| | | | 715/739 |
| 2008/0288862 A1* | 11/2008 | Smetters | G06F 17/218 |
| | | | 715/255 |
| 2009/0006948 A1* | 1/2009 | Parker | G06F 3/0483 |
| | | | 715/255 |
| 2009/0297118 A1* | 12/2009 | Fink | G06F 17/3082 |
| | | | 386/278 |

(Continued)

*Primary Examiner* — Ryan Barrett
*Assistant Examiner* — Haimei Jiang
(74) *Attorney, Agent, or Firm* — McDermott Will & Emery LLP

(57) ABSTRACT

A system and machine-implemented method for creating and sharing virtual collaboration objects, including receiving a request from a user to create a virtual collaboration object, the request identifying one or more portions of each of one or more stored digital source objects for inclusion in the virtual collaboration object, where for at least one of the stored digital source objects, the one or more portions comprise less than the full stored digital source object, creating a metadata list in response to the request including the one or more stored digital source objects and portion information identifying the one or more portions of each of the one or more stored digital source objects, generating a collaboration object identifier (ID) corresponding to the virtual collaboration object, associating the metadata list with the collaboration object ID and providing a reference to the collaboration object ID for sharing with one or more other users.

22 Claims, 4 Drawing Sheets

(56) References Cited

U.S. PATENT DOCUMENTS

| | | | |
|---|---|---|---|
| 2010/0262925 A1* | 10/2010 | Liu | G06Q 10/10 715/759 |
| 2010/0313239 A1* | 12/2010 | Chakra | G06F 21/6218 726/2 |
| 2011/0022662 A1* | 1/2011 | Barber-Mingo | G06Q 10/06 709/206 |
| 2011/0265147 A1* | 10/2011 | Liu | H04L 63/08 726/4 |
| 2012/0192055 A1* | 7/2012 | Antebi | G06F 17/30206 715/229 |
| 2013/0080565 A1* | 3/2013 | van Coppenolle | G06Q 30/06 709/213 |
| 2013/0151940 A1* | 6/2013 | Bailor | G06F 17/24 715/229 |
| 2013/0173531 A1* | 7/2013 | Rinearson | G06F 17/30011 707/608 |
| 2014/0006914 A1* | 1/2014 | Visconsi | G06F 17/211 715/202 |
| 2014/0337279 A1* | 11/2014 | Mo | G06Q 10/101 707/608 |

\* cited by examiner

METHOD AND SYSTEM FOR SHARING VIRTUAL COLLABORATION OBJECTS

BACKGROUND

The subject disclosure generally relates to sharing documents, and, in particular, to sharing documents for the purpose of collaboration.

Network-based document collaboration allows users to share and collaborate on documents. A user may create a document and share the document with one or more others users for comments and/or editing. The user may further assign different rights to various users when sharing the document with such users.

However, when sharing the document, the entire document is shared with other users and the author does not have control over only sharing parts of the document. If a user wishes to share parts of a document with other users, the user will first have to physically create a new document, including the parts of the original document, to share with other users for the purposes of collaboration.

Thus, it may be desirable to facilitate for a more efficient process of sharing only specific portions of a document with collaborators.

SUMMARY

The disclosed subject matter relates to a method, executed at one or more computing devices, for creating and sharing virtual collaboration objects, the method comprising receiving, at the one or more computing devices, a request from a user to create a virtual collaboration object, wherein the request identifies one or more portions of each of one or more stored digital source objects for inclusion in the virtual collaboration object, wherein, for at least one of the one or more stored digital source objects, the one or more portions of the stored digital object comprise less than the full stored digital source object. The method further comprising creating, using the one or more computing devices, a metadata list in response to the request, the metadata list including the one or more stored digital source objects and portion information identifying the one or more portions of each of the one or more stored digital source objects. The method further comprising generating, using the one or more computing devices, a collaboration object identifier (ID) corresponding to the virtual collaboration object and associating the metadata list with the collaboration object ID and providing, using the one or more computing devices, a reference to the collaboration object ID corresponding to the virtual collaboration object for sharing with one or more other users.

The disclosed subject matter also relates to a system for creating and sharing virtual collaboration objects, the system comprising one or more processors and a machine-readable medium comprising instructions stored therein, which when executed by the processors, cause the processors to perform operations comprising receiving a request from a user to create a virtual collaboration object, wherein the request identifies one or more portions of one or more stored digital source objects for inclusion in the virtual collaboration object, wherein, for at least one of the one or more stored digital source objects, the one or more portions of the stored digital object comprise less than the full stored digital source object. The operations further comprising creating a metadata list in response to the request, the metadata list including a listing of the one or more stored digital source objects and identifying the one or more portions of the one or more stored digital source objects. The operations further comprising generating a collaboration object identification (ID) identifying the virtual collaboration object and associating the metadata list with the collaboration object ID. The operations further comprising determining whether the user has requested to limit access to the virtual collaboration object. The operations further comprising generating an access control list when it is determined that the user has requested to limit access to the virtual collaboration object, the access control list including a listing of one or more authorized users having access to the virtual collaboration object. The operations further comprising associating the access control list with the collaboration object ID and providing a reference to the collaboration object ID corresponding to the virtual collaboration object for sharing with one or more other users.

The disclosed subject matter also relates to a machine-readable medium comprising instructions stored therein, which when executed by a machine, cause the machine to perform operations comprising receiving a request from a user to create a virtual collaboration object. The operations further comprising determining one or more portions of each of one or more stored digital source objects for inclusion in the virtual collaboration object, and an order in which the one or more portions of each of one or more stored digital source objects appear within the virtual collaboration object, wherein, for at least one of the one or more stored digital source objects, the one or more portions of the stored digital object comprise less than the full stored digital source object. The operations further comprising generating a metadata list in response to the request, the metadata list including information regarding each of the one or more stored digital source objects and portion identifiers identifying the one or more portions of each of the one or more stored digital source objects and order information indicating the order in which the one or more portions of each of one or more stored digital source objects appear within the virtual collaboration object. The operations further comprising generating a collaboration object identification (ID) for the virtual collaboration object and associating the metadata list with the collaboration object ID and providing a reference to the collaboration object ID for sharing with one or more other users.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
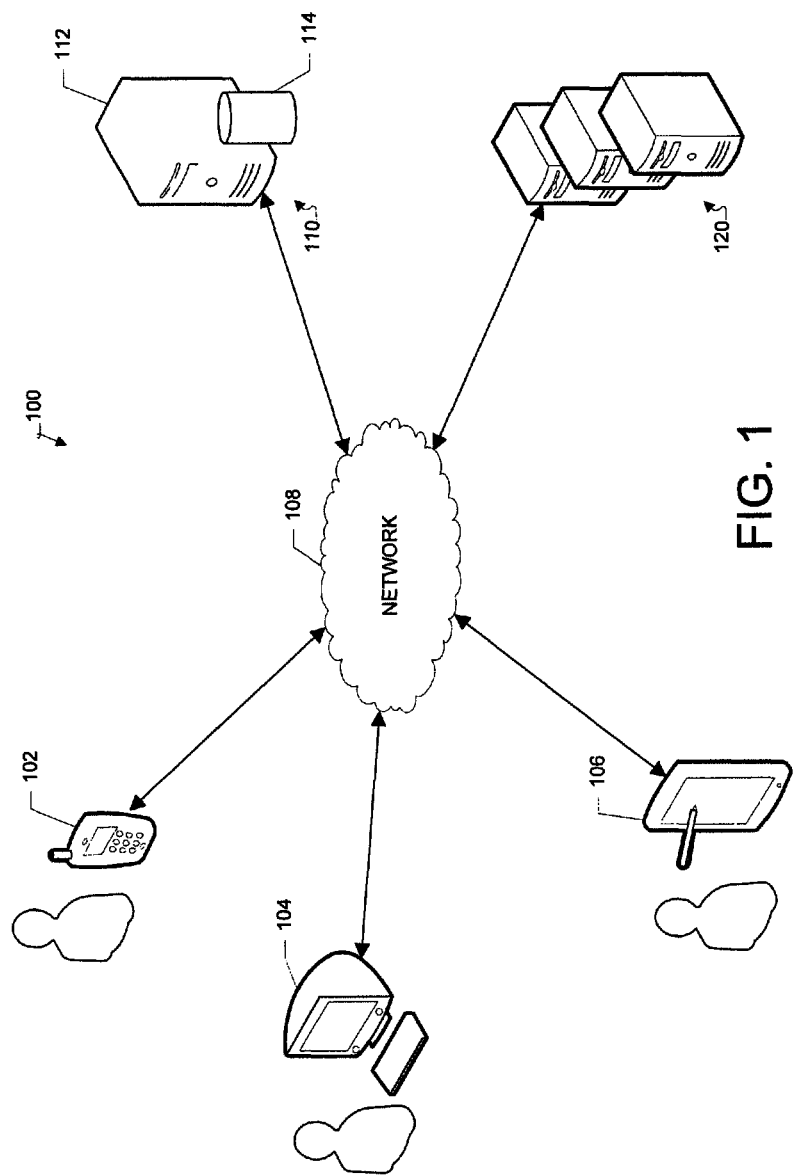
FIG. 1 illustrates an example client-server network environment which provides for sharing portions of one or more collaboration objects as a virtual collaboration object.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure provides for a system and method for sharing portions of one or more collaboration objects (e.g., documents, video, audio, images) with other users for the purpose of collaboration (e.g., receiving feedback, editing), without the need for creating a new physical object. The system provides the capability of generating virtual collaboration objects based on user specifications and sharing the virtual collaboration objects with other users for the purpose of collaboration.

For example, a user may wish to only share a portion of an electronic object (e.g., a stored digital object) that the user has created, with one or more other users. In such instance, the user specifies a start and end location for the portion(s) of the source object that the user wishes to share with other users (e.g., a user might want to share pages 1, 6-7, and 10-20 of a document that is 30 pages long). In that instance, the other users would not have access to the other portions of the electronic object (e.g., pages 2-5, 8-9, and 21-30). The system provides an identifier of the object and the specification of the portion(s) as a metadata list associated with a unique collaboration object identifier (ID) and generates a link to the collaboration object ID. The generated link may then be shared with other users. Furthermore, the user may specify access rights for different users with respect to the collaboration object ID. An Access Control List (ACL) is created and associated with the collaboration object ID (corresponding to the stored metadata) reflecting the various access rights with respect to the new virtual collaboration object identified by the collaboration object ID.

The link to the new virtual collaboration object may be shared with one or more other users for the purpose of collaboration. Once those users have received the link, a user may select the link to access the new virtual collaboration object. The system, upon receiving the indication that a user has selected the link, accesses the metadata information associated with the collaboration object ID. The system generates a virtual collaboration object based on the portion information (e.g., start and end locations) within the metadata list and displays the virtual collaboration object to the user requesting access (e.g., by selecting the link). In one instance, before providing access to the collaboration object, the system may determine the user's access rights by referencing the ACL associated with the collaboration object ID and provide access to the new virtual collaboration object based on those access rights.

The user may then review and/or edit the new virtual collaboration object (e.g., based on the user's access rights). The comments and/or edits to the new virtual collaboration object may then be generated and displayed the next time a user accesses the new virtual collaboration object. For example, the comments and edits may be stored along with the metadata for later viewing by the author of the original collaboration object(s). Additionally, the comments and edits may further be made to the original collaboration object (e.g., based on user preferences).

A new virtual collaboration object including portions from more than one source object including multi-media content is also possible in a similar manner. Source objects such as video clips, audio clips, image collections and text collaboration objects may be physically stored in their original format and in their entirety. A user may generate a virtual collaboration object by specifying portions of each of the one or more source objects (e.g., a starting point and ending point of one or more portions). The portion information is then stored within the metadata list. The metadata list is associated with a unique collaboration object ID. A reference to the collaboration object ID (e.g., within a link) may be shared with other users for the purpose of collaboration. Accordingly, a user may generate and share various collaboration objects made up of portions of one or more objects without the need to physically create and store the new collaboration object.

As used herein, the phrase "object" encompasses its plain and ordinary meaning, including but not limited to a collection of content and may include but is not limited to documents, images, videos, audio, multi-media documents and/or files and other digital files. "Collaboration objects" may include, but are not limited to, files, video clips, audio clips, documents, images, tools, posts, or other data shared for the purpose of collaboration. The terms "source object", "digital source object", "stored digital source object" and "physical object" are used interchangeably herein, and encompass their plain and ordinary meaning, including, but not limited to, an object being physically stored at a computing device (e.g., a database, storage medium). The term "virtual collaboration object," as used herein, encompasses its plain and ordinary meaning, including, but not limited to, an object comprising one or more portions of one or more stored digital source objects, where the virtual object is not digitally stored, and instead generated according to metadata associated with the virtual collaboration object in real time at the time of and in response to a user request.

Each collaboration object (e.g., both physical and virtual collaboration objects) may be associated with an Access Control List (ACL). An access control list (ACL), with respect to a computer file system, is a list of permissions attached to an object. An ACL specifies which users or system processes are granted access to objects, as well as what operations are allowed on given objects. Possible operations may include read-only, read-write, comment on, delete and other similar access rights with respect to an object. Each entry in a typical ACL may specify a subject and an operation.

The term "collaboration" encompasses its plain and ordinary meaning, including but not limited to, an activity in which one or more participants or services share information or points of view for the purpose of sharing knowledge or a decision regarding one or more documents and/or topics.

For example, a user of the system may generate a virtual collaboration object and may share the virtual collaboration object (e.g., using a link to the virtual collaboration object) with individual contacts and/or selected social groups at one or more social networking sites. The system may generate a post providing access to the collaboration object (e.g., a post including a link to the virtual collaboration object) to be displayed to the selected contacts at the social networking site.

As used herein, "posts" generally refer to any displayable notification or announcement regarding activities performed with respect to the collaboration object. The post may provide access to the collaboration object (e.g., through a link to the collaboration object) and allow the selected contacts to view and edit the collaboration object. The post may further be updated by the system as contacts access and modify the collaboration object.

Users of social networking sites may create associations with one another. The phrase "social networking site" as used herein encompasses its plain and ordinary meaning, including, but not limited to, an online service, platform or site that focuses on building and reflecting of social associations and interactions among users. These associations may be stored within a social graph at each social networking site. Such user associations may be defined on a user-to-user basis, or as a group of users associated through membership within a group. As used herein, "contacts" refer to other users that a user is associated with, at one or more social networking sites.

A user may create "social groups" (e.g., social circles) including one or more contacts to organize his/her associations. The social groups may be additionally used to control distribution of messages and content to contacts of the user. For example, "social circles" are categories to which a user can assign their social networking contacts and better control the distribution and visibility of social networking messages as well as other multimedia content (e.g., documents, and other collaboration objects). In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

In some embodiments, a social group may be asynchronous. For example, a first user may form a social group including one or more other users (e.g., a group of friends or family members). The users associated with the social group may or may not have a corresponding social group including the user and/or the other one or more users. To give a more specific example, a first user may have a group "siblings" that includes her two brothers and one sister. The sister may have a social group for "nuclear family" that includes the first user, her two brothers, and her parents. The two brothers may have created no social groups at all. In this way, although the accounts of the user may be connected in various ways, each user may be able to define one or more social groups including one or more of his/her contacts separately and distinctly.

A user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings.

The link to the virtual collaboration object may also be shared with various other contacts of the user through other means of messaging including for example through email, text messaging, instant messaging or other similar communication and/or messaging services allowing for a user to send the link to another user. The contacts of the user may include any contacts of the user (e.g., through social networking or other physical or internet and computer based means).

II. Example Client-Server Network Environment for Generating and Sharing Virtual Collaboration Objects FIG. 1 illustrates an example client-server network environment which provides for sharing portions of one or more collaboration objects as a virtual collaboration object. A network environment 100 includes a number of electronic devices 102, 104 and 106 communicably connected to a server 110 and remote servers 120 by a network 108. Server 110 may further be in communication with remote servers 120 either through the network 108 or through another network or communication means. Server 110 includes a processing device 112 and a data store 114. Processing device 112 executes computer instructions stored in data store 114, for example, to assist in sharing one or more virtual collaboration objects for the purpose of collaboration at electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). The server 110 may host the web server communicationally coupled to the browser at the client device (e.g., electronic devices 102, 104 or 106) via network 108.

In one example the server 110 may be communicationally coupled to one or more remote servers 120 hosting one or more social networking sites and/or messaging services. Server 110 and/or one or more remote servers 120 can be any system or device having a processor, a memory and communications capability for hosting an Access Control Repository and/or service, one or more messaging and communication services, and/or one or more remote social networking sites.

In one embodiment, server 110 and/or one or more remote servers 120 may be further capable of maintaining social graphs of users and their contacts. The remote social networking services may enable users to create a profile and associate themselves with other users at a remote social networking service. The remote servers 120 may further facilitate the generation and maintenance of a social graph including the user created associations. The social graphs may include, for example, a list of all users of the remote social networking service and their associations with other users of a remote social networking service.

In some example aspects, server 110 and/or one or more remote servers 120 can be a single computing device such as a computer server. In other embodiments, server 110 and/or one or more remote servers 120 can represent more than one computing device working together to perform the actions of a server computer (e.g., cloud computing). In some embodiments, server 110 and/or one or more remote servers 120 may be coupled with various remote databases or storage services. Communications between the client devices 102-106, server 110 and/or one or more remote servers 120 may be facilitated through the HTTP communication protocol. Other communication protocols may also be facilitated including for example, XMPP communication, for some or all communications between the client devices 102-106, server 110 and one or more remote servers 120.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

In one example, the system of the present disclosure may be hosted at server 110. A user interacting with a client device (e.g., electronic devices 102, 104 and 106), may request to share a collaboration object including portions of one or more other objects with one or more others for the purpose of collaboration. Upon detecting the user request, the system may prompt the user to provide information identifying the portions of the one or more source objects. The one or more source objects may be stored at the client device, or remotely at a database. The system receives the information from the user, including information identifying the portion(s) of the one or more source objects to be included within the virtual collaboration object A metadata list is generated storing a listing of the one or more source objects and portion identifiers defining the portion(s) of each of the one or more source objects included within the new collaboration object. The system generates a collaboration object ID for the new collaboration object and associates the metadata list with the collaboration ID.

The system may further determine if the user wishes to control/limit access to the new collaboration object or if the collaboration object should be shared as a public object (i.e., any person with access to a link to the object will have rights to view/edit the collaboration object). If the system determines that the user wishes to limit access to the new collaboration object to specific contacts and/or to limit access rights to the collaboration object, the system generates an Access Control List (ACL) and associates the ACL with the collaboration object ID. The ACL includes a listing of contacts that are authorized to access the new collaboration objects and/or access rights associated with access to the collaboration object (e.g., with respect to one or more of users having authorized access to the collaboration object). The access control information is stored within the ACL associated with the collaboration object ID. A link to the collaboration object ID is generated and provided to the user and/or shared with one or more contacts of the user. The link may be sent to contacts via various communication and/or messaging services (e.g., hosted at one or more remote servers 120) and/or may be posted to the user's social networking account at one or more social networking services (e.g., hosted at one or more remote servers 120). Users able to view the link may click on the link to access the new collaboration object.

Upon receiving an indication of a user request to access the collaboration object (e.g., by clicking on the link), the system identifies the collaboration object according to the collaboration object ID. The system determines if access to the identified collaboration object is limited (i.e., if the collaboration object ID is associated with an ACL). If so, the system determines if the user should be given access to the identified collaboration object, and if so, determines the access rights of the user according to the ACL.

Next, the system accesses the metadata associated with the collaboration object ID (i.e., the metadata list). The metadata includes a listing of one or more collaboration objects and portion information associated with each of the one or more collaboration objects (e.g., portion identifiers). The system accesses each of the one or more collaboration objects and determines one or more portions of each collaboration object according to the portion identifiers associated with the collaboration object. According to the metadata, the system then generates a new virtual collaboration object including the portions of the one or more collaboration objects as indicated by the metadata information, and provides the new collaboration object for display to the user requesting access to the collaboration object, according to the access rights of the user.

III. Example Processes for Generating and Sharing Virtual Collaboration Objects

Figure 2:
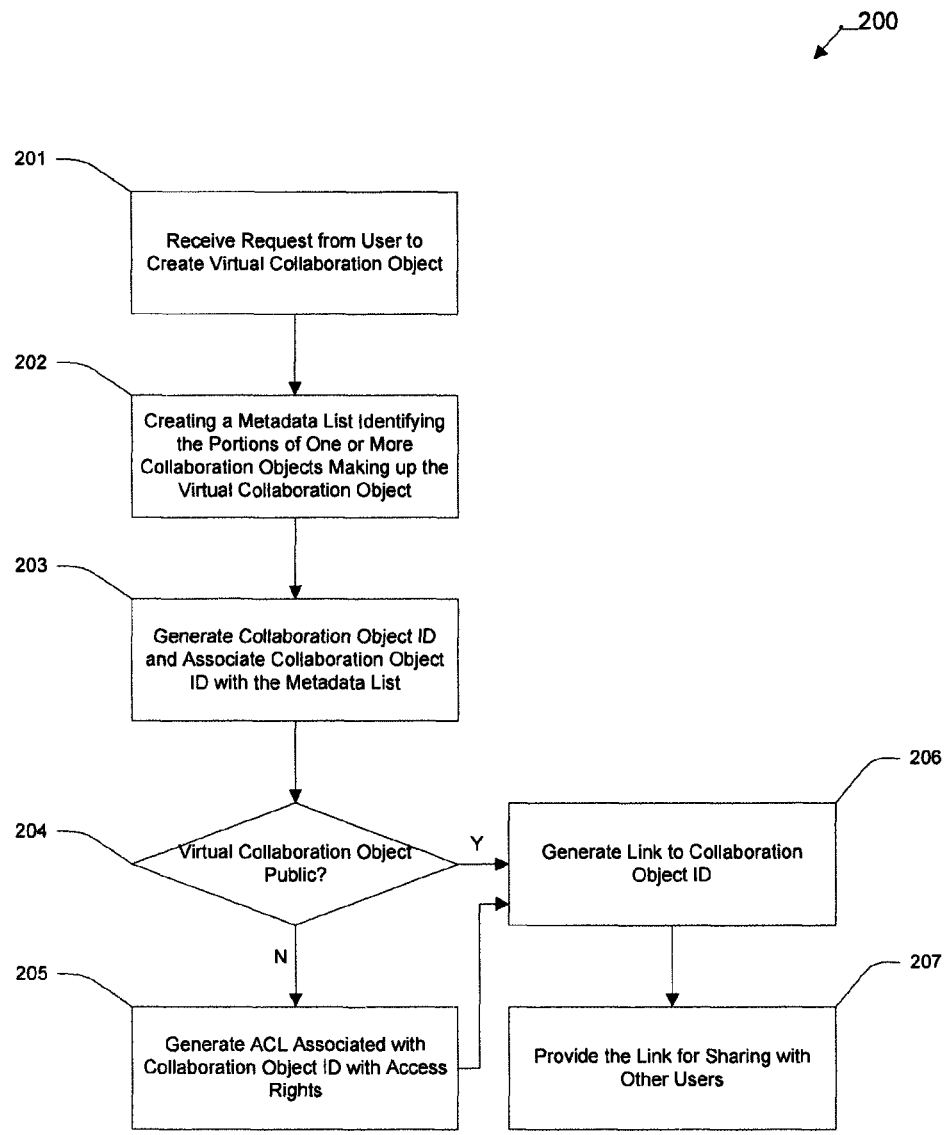
FIG. 2 illustrates a flow diagram of a process for generating a new virtual collaboration object for sharing with one or more contacts of a user.

FIG. 2 illustrates a flow diagram of a process 200 for generating a new virtual collaboration object for sharing with one or more contacts of a user. In block 201, the system receives a request from a user to create a new virtual collaboration object. The collaboration object may include portions from one or more other objects including documents, video, audio, images, and/or other multi-media items and digital files. The system may query the user, and/or the user may provide information regarding which portions of one or more collaboration objects should be included within the new virtual collaboration object.

In one example, for each portion of each of the one or more collaboration objects, the user may provide start and end locations within the collaboration object, thus identifying the portion of the collaboration object to be included within the new virtual collaboration object. Where one of the one or more collaboration objects includes a document including text, the user may provide the page, line and word number for the start and end of the portion of the document that should be included within the new virtual collaboration object. With respect to video and audio files, the time stamp of the portion beginning and end with respect to the entire video and/or audio clip may be provided as indication of the portion(s) of the video and/or audio file that the should be included within the new virtual collaboration object. Similarly, with respect to objects having one or more images, an image ID, image name, or other information identifying the specific image(s) may be provided. The portion identifiers (i.e., the start end points or other identifier of the portion of the source collaboration object) are received by the system. The system may further receive information regarding the order in which the user wishes the portions of the one or more source objects to appear within the new virtual collaboration object.

In block 202, the system creates a metadata list including an identifier for each of the one or more source objects (e.g., including information as to the location where the collaboration object can be accessed from) and further including portion information identifying the portion(s) of each of the one or more collaboration objects, that make up the new virtual collaboration object. In one example, the metadata list further includes an indication of the order in which the one or more portions of the one or more collaboration objects should appear within the virtual collaboration object. For example, the portions may be listed in order, or an order indicator may be associated with each portion, indicating its position within the new virtual collaboration object. In block 203, the system generates a unique collaboration object ID for the new virtual collaboration object and associates the metadata list with the collaboration object ID.

In block 204, the system determines if the user wishes to limit access to the new virtual collaboration object or whether the collaboration object is public (i.e., accessible by any user having access to the link). Access to a collaboration object may be limited to specific users (e.g., contacts of the user) and/or may be limited to certain access right(s) (e.g., read only, editing, delegation rights) for each of the users having authorized access to the collaboration object. If, in block 204, it is determined that the new virtual collaboration object is a public object the process continues to block 206.

Otherwise, in block 205, the system generates an ACL. The ACL includes a listing of one or more users having authorized access to the new virtual object, and further includes any access rights associated with each of the one or more authorized users. The generated ACL is associated with the virtual collaboration object ID, and the process continues to block 206.

In block 206, the system generates a link to the collaboration object ID, and in block 207, the system provides the link for sharing. The link may be sent to one or more users indicated by the user, and/or may be displayed to the user for sending to one or more desired users for the purpose of collaboration. The link may be sent to contacts via various communication and/or messaging means and/or may be posted to the user's social networking account at one or more social networking services. Users able to view the link may click on the link to access the new collaboration object.

Figure 3:
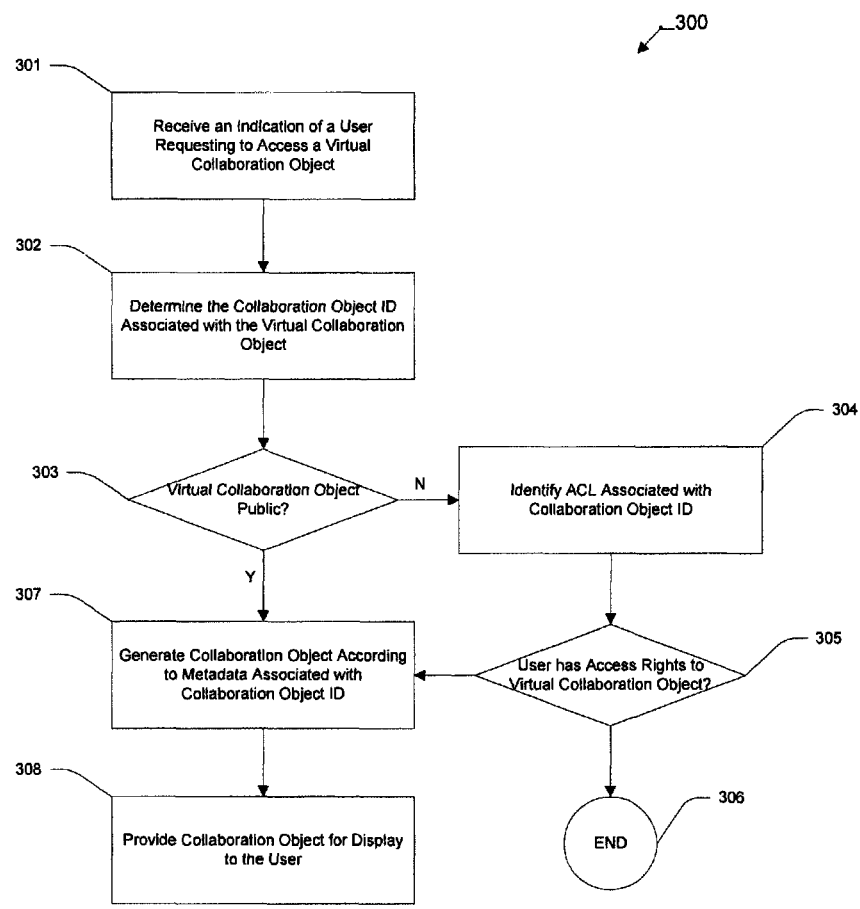
FIG. 3 illustrates a flow diagram of a process for providing access to a virtual collaboration object.

FIG. 3 illustrates a flow diagram of a process 300 for providing access to a virtual collaboration object. In block 301, the system receives an indication of a user requesting to access a virtual collaboration object. For example, a user having access to a link (e.g., viewing a post with the link and/or receiving the link within a message) may select the link to gain access to the document.

In block 302, the system determines the collaboration object ID associated with the user request. For example, the link provided to the user may include the collaboration object ID or may include an identifier or reference to the collaboration object ID. Next, in block 303, the system determines whether the virtual collaboration object associated with the collaboration object ID is public or whether the user sharing the collaboration object (e.g., the user creating the virtual collaboration object, and/or a user having delegation rights to the virtual collaboration object) has requested to limit access to the collaboration object. For example, the system determines if the collaboration object ID is associated with an ACL.

If, in block 303, it is determined that the virtual collaboration object is a public collaboration object (i.e., the virtual collaboration ID is not associated with an ACL), the process continues to block 306. Otherwise, if in block 303, the system determines that an ACL is associated with the collaboration object ID, in block 304, the system accesses the ACL associated with the collaboration object ID. In block 305, the system determines whether the user has access rights to the virtual collaboration object based on the ACL. For example, the system compares an identifier of the user requesting access to the virtual collaboration object with the listing of authorized users within the accessed ACL, and determines if the user requesting access is not of the one or more authorized users having authorization to access the virtual collaboration document.

Upon determining that a user is an authorized user according to the ACL, the system may also determine the access right level of the user. For example, authorized users may have various levels of access with respect to the virtual object (e.g., read only, read/write, delegation). The ACL may provide information regarding the level of access rights for one or more authorized users, or such information may be available in a separate list or through a separate application, and the system may determine the user's access right levels.

If, in block 305, the system determines that the user does not have any access rights to the virtual collaboration object, the process ends in block 306. In one example, the system may generate a notification to the user, informing the user that the user does not have the proper permissions to access the virtual collaboration object, and may further provide mechanisms for the user to request to be granted authorization to access the virtual collaboration object.

On the other hand, if in block 305, the system determines that the user has access rights to the collaboration object, the process continues to block 307. In block 307, the system generates the collaboration object according to metadata information associated with the collaboration object. For example, the system identifies a metadata list associated with the collaboration object ID. The metadata list includes information regarding one or more collaboration objects and portion information for each of the one or more collaboration objects. As described above, the portion information may include portion identifiers (e.g., start/end point sets or other identifiers that indicate a portion of a collaboration object) associated with each of the one or more collaboration objects.

During block 305, the system accesses each of the one or more collaboration objects and determines one or more portions of each collaboration object according to the portion identifier(s) associated with the collaboration object. According to the metadata list, the system generates a new virtual collaboration object including the portion(s) of the one or more collaboration objects as indicated by the metadata information. As described above, the metadata list may include information regarding the order in which the portion (s) of the one or more collaboration objects should be combined within the virtual collaboration object. The system may combine the collaboration objects according to the order information included within the metadata information. In block 308, the system provides the new virtual collaboration object for display to the user requesting access to the collaboration object. The system may grant access to the virtual collaboration object according to the access rights of the user, as determined during block 305.

Once the user is granted access to the virtual collaboration object, the user may provide one or more comments regarding the content of the virtual collaboration object, may edit the virtual collaboration object and/or may share a link to the virtual collaboration object with other users (e.g., based on the access rights granted to the user). The comments and/or edits to the new virtual collaboration object may then be generated and displayed the next time a user accesses the new virtual collaboration object. For example, the comments and edits may be stored along with the metadata for later viewing by the author of the original collaboration object(s). Additionally, the comments and edits may further be made to the original collaboration object (e.g., based on user preferences).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

IV. Example System for Generating and Sharing Virtual Collaboration Objects

Figure 4:
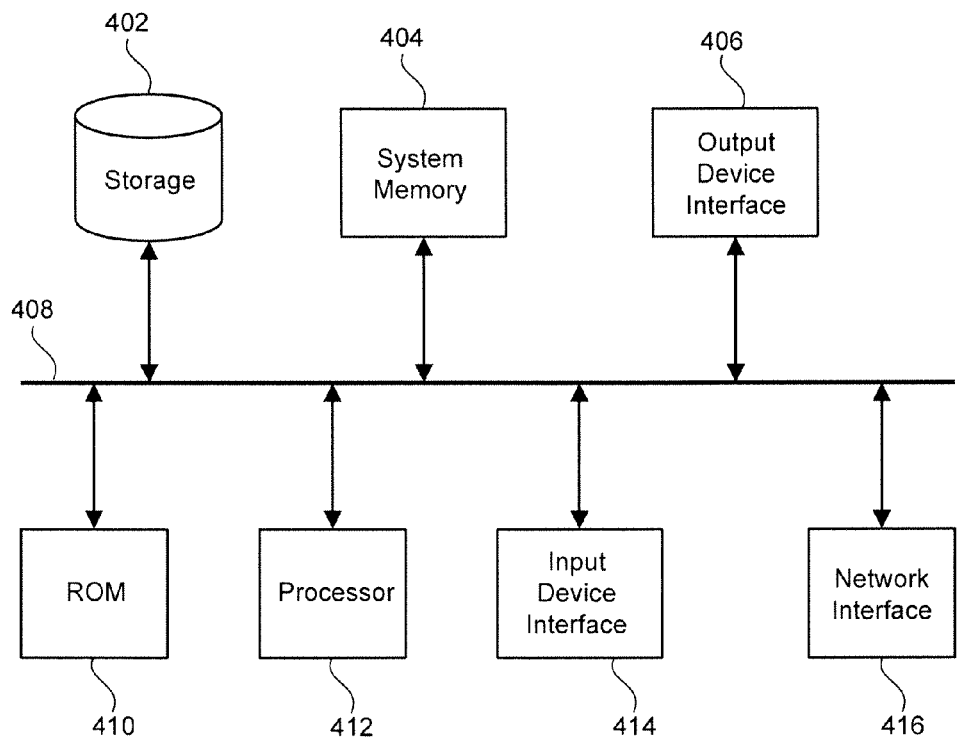
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for sharing portions of one or more collaboration objects as a virtual collaboration object according to various embodiments. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of exemplary approaches. Based upon design preferences, it is understood that the specific order or hierarchy of blocks in the processes may be rearranged, or that some illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be use together. Features under one heading may be combined with features under one or more other heading and all features under one heading need not be use together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, executed at one or more computing devices, for creating and sharing virtual collaboration objects, the method comprising:
   receiving, at the one or more computing devices, a request from a user to create a virtual collaboration object, wherein the request comprises a selection of two or more portions of each of one or more stored digital source objects for inclusion in the virtual collaboration object and the request further comprises order information that indicates a display order of the two or more portions within the virtual collaboration object, wherein, for at least one of the one or more stored digital source objects, the two or more portions of the stored digital source object comprise less than an entirety of the at least one of the one or more stored digital source objects;
   creating, using the one or more computing devices, a metadata list in response to the request, the metadata list including the one or more stored digital source objects and portion information identifying the two or more portions of each of the one or more stored digital source objects;
   generating, using the one or more computing devices, a collaboration object identifier (ID) corresponding to the virtual collaboration object and associating the metadata list with the collaboration object ID;
   providing, using the one or more computing devices, a reference to the collaboration object ID corresponding to the virtual collaboration object for sharing with one or more other users, wherein the reference to the collaboration object ID provides access to the virtual collaboration object;
   receiving an indication that a second user having access to the virtual collaboration object has selected the reference;
   identifying the received order information associated with each of the two or more portions of each of the one or more stored digital source objects;
   automatically generating, in response to the received indication that the second user has selected the reference, the virtual collaboration object in real time at the time of receiving the indication based on the metadata list by retrieving the two or more selected portions of each of the one or more stored digital source objects, wherein retrieving is based on the identified order information associated with each of the two or more portions; and
   providing the generated virtual collaboration object without digitally storing the virtual collaboration object for display to the second user.

2. The method of claim 1, further comprising:
   determining, using the one or more computing devices, whether the virtual collaboration object is a public virtual collaboration object, wherein the step of determining comprises determining if the user has requested to limit access to the virtual collaboration object;
   generating, using the one or more computing devices, an access control list in response to determining that the virtual collaboration object is not the public virtual collaboration object, the access control list including a list of one or more authorized users authorized to access the virtual collaboration object; and
   associating the access control list with the collaboration object ID.

3. The method of claim 2, wherein the one or more authorized users are identified by the user.

4. The method of claim 2, further comprising:
   receiving an indication of an access right level for each of the one or more authorized users; and
   storing the access right level of each of the one or more authorized users within the access control list, wherein the access right level of each of the one or more authorized users indicates functions that each of the one or more authorized users is authorized to perform with respect to the virtual collaboration object.

5. The method of claim 1, wherein the each of the one or more stored digital source objects comprise one or more of video content, audio content, image content or text content.

6. The method of claim 1, wherein the metadata list includes information regarding a location where each of the one or more stored digital source objects is stored.

7. The method of claim 1, wherein the order information indicates a position of each of the two or more portions with respect to each of the other two or more portions within the virtual collaboration object.

8. The method of claim 1, further comprising:
   receiving an indication of a request from the second user to access the virtual collaboration object, the request comprising a selection of the reference to the collaboration object ID corresponding to the virtual collaboration object;
   identifying the collaboration object ID in response to receiving the indication;
   identifying the metadata list associated with the identified collaboration object ID; and
   automatically generating the virtual collaboration object according to the identified metadata list.

9. The method of claim 8, wherein the automatically generating the virtual collaboration object comprises:
   identifying the one or more stored digital source objects listed within the metadata list;
   identifying the two or more portions of each of the one or more stored digital source objects; and
   accessing the two or more portions of each of the one or more stored digital source objects.

10. The method of claim 8, further comprising:
    determining whether the collaboration object ID is associated with an access control list;
    accessing the access control list when the collaboration object ID is associated with the access control list, the access control list including a listing of one or more authorized users having access to the virtual collaboration object; and
    determining whether the second user has access to the virtual collaboration object according to the access control list based at least in part on whether the second user is one of the one or more authorized users listed in the access control list.

11. The method of claim 10, further comprising providing the virtual collaboration object for display to the second user if it is determined that the collaboration object ID is not associated with the access control list.

12. The method of claim 10, further comprising providing the virtual collaboration object for display to the second user, if it is determined that the second user has access to the virtual collaboration object.

13. The method of claim 12, wherein the access control list further includes an access right level for each of the one or more authorized users having access to the virtual collaboration object, and
wherein providing the virtual collaboration object for display to the second user further comprises:
determining the access right level of the second user according to the access control list; and
providing the virtual collaboration object for display to the second user according to the determined access right level.

14. The method of claim 13, wherein the access right level defines one or more functionalities that the second user is authorized to perform with respect to the virtual collaboration object and wherein providing the generated virtual collaboration object according to the determined access right level provides the second user with an ability to perform the one or more functionalities with respect the generated new virtual collaboration document.

15. A system comprising:
one or more processors; and
a machine-readable medium comprising instructions stored therein, which when executed by the processors, cause the processors to perform operations comprising:
receiving a request from a user to create a virtual collaboration object, wherein the request identifies two or more portions of one or more stored digital source objects for inclusion in the virtual collaboration object;
creating a metadata list in response to the request, the metadata list including one or more digital source object identifiers of the one or more stored digital source objects, two or more portion identifiers of the two or more portions of the one or more stored digital source objects without including the two or more portions in the metadata list, and order information indicating an order in which the two or more portions of the one or more stored digital source objects appear within the virtual collaboration object;
generating a collaboration object identification (ID) identifying the virtual collaboration object and associating the metadata list with the collaboration object ID;
determining whether the user has requested to limit access to the virtual collaboration object;
generating an access control list when it is determined that the user has requested to limit access to the virtual collaboration object, the access control list including a listing of one or more authorized users having access to the virtual collaboration object;
associating the access control list with the collaboration object ID;
providing a reference to the collaboration object ID corresponding to the virtual collaboration object for sharing with one or more other users, wherein the reference to the collaboration object ID provides access to the virtual collaboration object;
receiving an indication that a second user having access to the virtual collaboration object has selected the reference;
automatically generating, in response to the received indication that the second user has selected the reference, the virtual collaboration object based on the metadata list by retrieving the two or more portions from the one or more stored digital source objects based at least in part on the one or more digital source object identifiers and the two or more portion identifiers included in the metadata list, and combining the retrieved two or more portions based on the order information included in the metadata list; and
providing the generated virtual collaboration object for display to the second user.

16. The system of claim 15, the operations further comprising:
receiving an indication of a request from the second user to access the virtual collaboration object, the request comprising a selection of the reference to the collaboration object ID;
identifying the collaboration object ID in response to receiving the indication;
identifying the metadata list associated with the identified collaboration object ID; and
automatically generating the virtual collaboration object according to the identified metadata list.

17. The system of claim 15, the operations further comprising:
accessing the access control list when it is determined that the collaboration object ID is associated with the access control list;
determining whether the user is one of the one or more authorized users listed in the access control list; and
providing the virtual collaboration object for display to the user, when it is determined that the user is one of the one or more authorized users listed in the access control list.

18. The system of claim 17, the operations further comprising providing the virtual collaboration object for display to the user when it is determined that the collaboration object ID is not associated with the access control list.

19. A non-transitory machine-readable medium comprising instructions stored therein, which when executed by a machine, cause the machine to perform operations comprising:
receiving a request from a user to create a virtual collaboration object, the request comprising a selection of two or more portions of one or more stored digital source objects for inclusion in the virtual collaboration object;
generating a metadata list in response to the request, the metadata list including one or more digital source object identifiers identifying the one or more stored digital source objects, two or more portion identifiers identifying the two or more portions of the one or more stored digital source objects, and order information indicating an order in which the two or more portions of the one or more stored digital source objects appear within the virtual collaboration object;
generating a collaboration object identification (ID) for the virtual collaboration object and associating the metadata list with the collaboration object ID; and providing a reference to the collaboration object ID for sharing with one or more other users, wherein the reference to the collaboration object ID provides access to the virtual collaboration object;

receiving an indication that a second user having access to the virtual collaboration object has selected the reference;

automatically generating, in response to the received indication that the second user has selected the reference, the virtual collaboration object based on the metadata list by retrieving the two or more portions from the two or more stored digital source objects based at least in part on the one or more digital source object identifiers and the two or more portion identifiers included in the metadata list and combining the retrieved two or more portions based on the order information included in the metadata list; and providing the generated virtual collaboration object for display to the second user.

20. The non-transitory machine-readable medium of claim 19, the operations further comprising:

determining whether the user has requested to limit access to the virtual collaboration object;

generating an access control list when it is determined that the user has requested to limit access to the virtual collaboration object, the access control list including a listing of one or more authorized users having access to the virtual collaboration object; and associating the access control list with the collaboration object ID.

21. The non-transitory machine-readable medium of claim 19, the operations further comprising:

receiving an indication of a request from a second user to access the virtual collaboration object, the request comprising a selection of the reference to the collaboration object ID;

identifying the collaboration object ID in response to receiving the indication;

identifying the metadata list associated with the identified collaboration object ID;

automatically generating the virtual collaboration object according to the identified metadata list;

determining if the second user has access to the virtual collaboration object; and providing the generated virtual collaboration object for display to the second user when it is determined that the second user has access to the virtual collaboration object.

22. The non-transitory machine-readable medium of claim 19, wherein the virtual collaboration object is generated in real time at the time of receiving the indication and the generated virtual collaboration object is provided for display without digitally storing the virtual collaboration object.

* * * * *